Jan. 6, 1925.
A. F. MASURY
VEHICLE BODY
Filed May 1, 1924
1,522,200
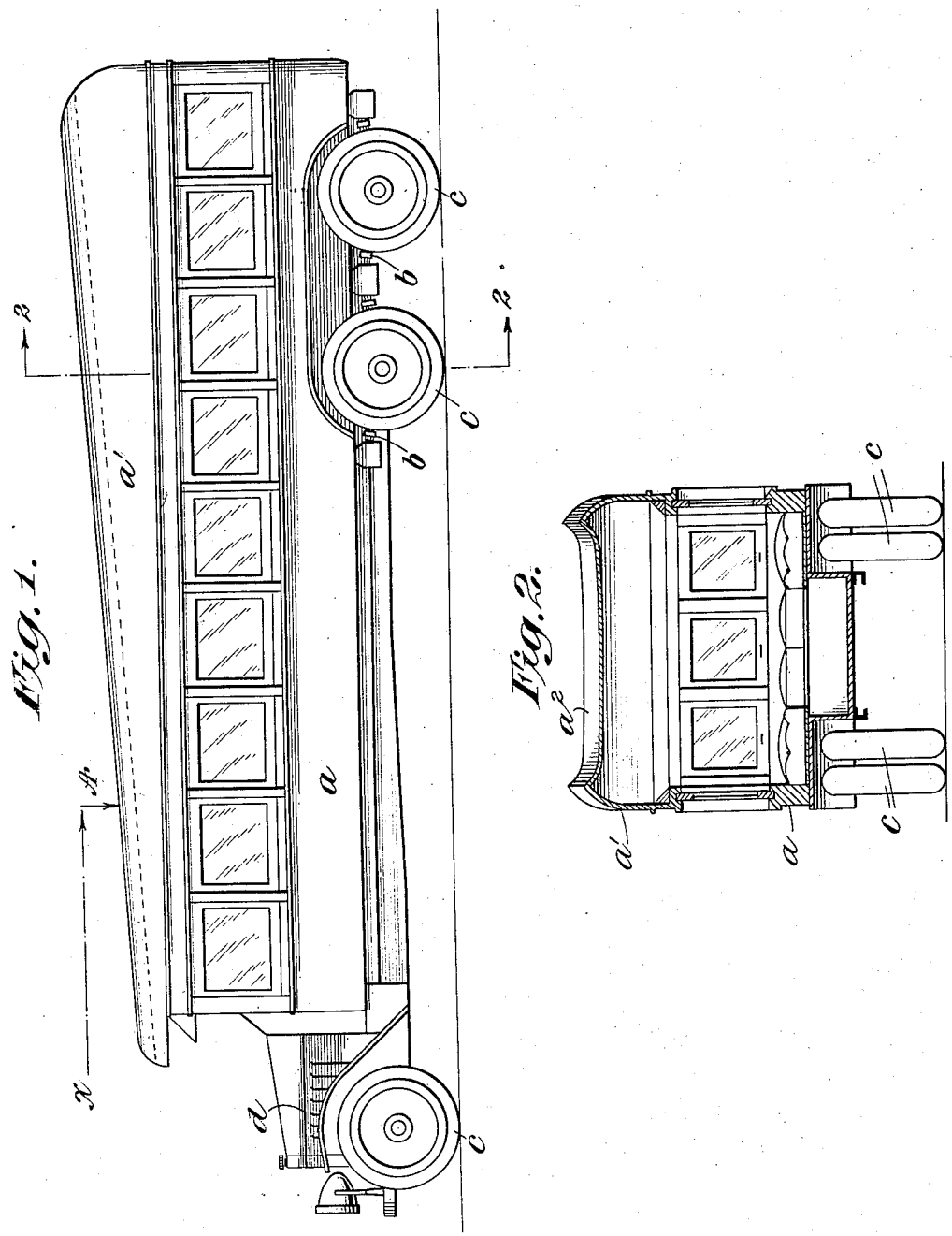
INVENTOR.
Alfred F. Masury
BY
Redding, Greeley, O'Shea & Campbell
ATTORNEYS.

Patented Jan. 6, 1925.

1,522,200

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

VEHICLE BODY.

Application filed May 1, 1924. Serial No. 710,234.

*To all whom it may concern:*

Be it known that I, ALFRED F. MASURY, a citizen of the United States, residing in the borough of Manhattan, of the city of New York, in the State of New York, have invented certain new and useful Improvements in Vehicle Bodies, of which the following is a specification, reference being had to the accompanying drawings, forming a part hereof.

This invention relates to an improved vehicle body adapted to travel at relatively high speeds and in which the body is supported yieldingly with respect to the wheels. It has been proposed in both road vehicles and rail cars to employ devices commonly termed snubbers to check upward movements of the vehicle body with respect to the wheels. Further, many vehicles, particularly road vehicles, depend to a large extent for their riding qualities on their weight, to the end that the vehicle will, as the popular expression is, "hold the road." The principal object of the present invention is to incorporate in a vehicle body means by which the downward pressure of air is impressed thereon, particularly when the vehicle is traveling at higher speeds, which pressure will oppose upward movements of the vehicle body both in rebound from the wheels and, as well, when the wheels tend to leave the road. In the simplest embodiment the top of the vehicle is so formed as to be subjected to a downward air pressure which will have the effect described. The preferred form of top is one which is of relatively large superficial area, slopes appreciably from front to rear of the vehicle and, is concave in cross-section to define, as it were, the column of air which exerts the downward pressure desired. The concave configuration, in addition, has the effect of subjecting the top to air pressure tending to hold the body against swaying and directional changes which movements, for the purposes of this application, are intended to be embraced within the term "holding the road." The invention will be described at greater length hereinafter with reference to the accompanying drawings, in which:

Figure 1 is a view in side elevation of a motor bus having a top of improved form.

Figure 2 is a view in transverse section through the body shown in Figure 1 and taken on the plane indicated by the line 2—2 of Figure 1 and looking in the direction of the arrows.

As the description proceeds it will be evident that the improvements are equally applicable to rail cars but for convenience a motor propelled bus is illustrated which, it may be assumed, is subject to road shocks. The riding quality of such a vehicle depends to a great degree on how closely the vehicle holds the road and also upon the checking of rebound movements upwardly of the body on its spring supports. The bus body $a$ is shown as supported through springs $b$ on wheels $c$, the propelling motor (not illustrated) being disposed under the bonnet $d$ in accordance with accepted practice. The principle of the invention is based on the association with the body $a$ of means whereby a downward component of air pressure will be impressed thereon particularly when the vehicle is traveling at higher speeds. The most convenient means available for impressing such a downward component of air pressure on the body is through the top $a'$ thereof. The top $a'$ slopes rearwardly and upwardly to an appreciable degree. In the forward movement of the vehicle the top moves against the pressure of air indicated by the line $x$ which may be resolved into components of which one indicated at A is vertical and represents downward pressure of the air on the top. The effect of this component pressure is to check upward movements of the vehicle body on the springs $b$ and resist, as a whole, tendencies for the wheels $c$ to leave the road momentarily. The net effect is that the vehicle holds the road to a greater degree than heretofore and its riding qualities are improved correspondingly. The action described may be enhanced to a degree by forming the top in cross-sectional form, concave, as indicated at $a^2$ in Figure 2. This concave or trough like form naturally defines the air currents which subject the vehicle to downward pressure in the manner pointed out and to an extent confines the column of air creating the downward pressure. Further, the side walls of the concave section $a^2$ are subjected to outward pressures whereby swaying of the vehicle body and directional changes are resisted. The superficial area of the top subjected to air pressure is also increased by a dished form.

The principle underlying the present invention may be incorporated in vehicle bodies by providing other surfaces than the top which may be subjected to downward air pressures created in the manner herein contemplated and changes in the form of the top may be made, without departing from the invention.

What I claim is:

1. In a vehicle, in combination with wheels, body and spring suspension therefor, a top for the body concave in cross-sectional form and subjected to an appreciable downward air pressure upon forward travel of the vehicle.

2. In a vehicle, in combination with wheels, body and spring suspension therefor, a top for the body dished in cross-sectional form and sloping upwardly from front to rear of the body and subjected to an appreciable downward air pressure upon forward travel of the vehicle.

This specification signed this 28th day of April, A. D. 1924.

ALFRED F. MASURY.